United States Patent
Sudo (10) Patent No.: US 8,085,361 B2
(45) Date of Patent: Dec. 27, 2011

(54) LIQUID CRYSTAL MODULE

(75) Inventor: Tatsuji Sudo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 444 days.

(21) Appl. No.: 12/344,618

(22) Filed: Dec. 29, 2008

(65) Prior Publication Data

US 2009/0190066 A1    Jul. 30, 2009

(30) Foreign Application Priority Data

Jan. 24, 2008  (JP) ................................ 2008-013234

(51) Int. Cl.
*G02F 1/1335*    (2006.01)

(52) U.S. Cl. ................ 349/70; 349/61; 349/62; 349/63; 349/64; 349/65; 349/66; 349/67; 349/68; 349/69; 349/71; 362/614; 315/294

(58) Field of Classification Search ................ None
See application file for complete search history.

(56) References Cited

U.S. PATENT DOCUMENTS

| 5,089,943 A * | 2/1992 | Wolfelschneider ........... 362/216 |
| 2005/0219861 A1 * | 10/2005 | Oka ............................... 362/614 |
| 2010/0283937 A1 * | 11/2010 | Takeba ............................ 349/61 |

FOREIGN PATENT DOCUMENTS

| EP | 1 582 913 A1 | 3/2005 |
| JP | 2004-335378 A | 11/2004 |
| JP | 2006-114445 A | 4/2006 |
| JP | 2006-216540 A | 8/2006 |
| JP | 2008-226651 A | 9/2008 |

* cited by examiner

*Primary Examiner* — Thanh-Nhan Nguyen
(74) *Attorney, Agent, or Firm* — Global IP Counselors (57) ABSTRACT

A liquid crystal module includes a rear frame, a light reflecting sheet, a plurality of U-shaped cold cathode tubes, an optical sheet and a liquid crystal panel. The light reflecting sheet is disposed on the rear frame. The U-shaped cold cathode tubes are disposed above the light reflecting sheet and arranged parallel to each other. Each of the U-shaped cold cathode tubes includes a U-shaped bent part and a pair of end portions extending from the U-shaped bent part. Widths of the U-shaped bent parts of the U-shaped cold cathode tubes are different from each other. Overall lengths of the U-shaped cold cathode tubes from one end portions to the other end portions along the U-shaped cold cathode tubes are equal to each other. The optical sheet is disposed above the U-shaped cold cathode tube. The liquid crystal panel is disposed above the optical sheet.

18 Claims, 6 Drawing Sheets

LIQUID CRYSTAL MODULE

CROSS-REFERENCE TO RELATED APPLICATIONS

This application claims priority to Japanese Patent Application No. 2008-013234 filed on Jan. 24, 2008. The entire disclosure of Japanese Patent Application No. 2008-013234 is hereby incorporated herein by reference.

BACKGROUND OF THE INVENTION

1. Field of the Invention

The present invention generally relates to a liquid crystal module. More specifically, the present invention relates to a liquid crystal module having U-shaped cold cathode tubes.

2. Background Information

With a conventional directly backlit liquid crystal module, a light reflecting sheet is provided on an inside of a rear frame. A plurality of cold cathode tubes parallel to each other is arranged over the light reflecting sheet. An optical sheet and a liquid crystal panel are disposed above the cold cathode tubes.

Some of the directly backlit liquid crystal modules have straight cold cathode tubes installed, and some have U-shaped cold cathode tubes installed. Among the latter (liquid crystal modules in which U-shaped cold cathode tubes are installed), there are some in which a plurality of U-shaped cold cathode tubes having different widths (e.g., bending pitch) of the U-shaped bent parts are installed in order to reduce variance in brightness, etc.

The U-shaped cold cathode tubes of varying width of the U-shaped bent parts are produced by bending in a U-shape straight cold cathode tubes whose overall length varies by the difference in their widths of the U-shaped bent parts, so that regardless of how wide the U-shaped bent parts are, the length from the ends of the U-shaped cold cathode tube to the U-shaped bent part is always the same.

Meanwhile, there has been a proposal for a direct backlight in which the cold cathode tubes have a configuration which forms an approximate rectangle from one tube end to the other, so that short tube segments are present in substantially the same length in left and right short tube segment areas. As a result, light emission densities of the left and right short tube segment areas are substantially the same, and the brightness is uniform at the left and right ends as seen through a diffuser plate (see Japanese Laid-Open Patent Application No. 2004-335378, for example).

There has also been proposed a backlight assembly having a holding container, cold cathode tubes, a reflector plate and an optical member. The holding container includes a base part and side parts extending from the base part and forming a holding space. The cold cathode tubes are held in the holding container and generate light. The reflector plate is disposed between the cold cathode tubes and the base part of the holding container and includes a protrusion that protrudes in the direction of the cold cathode tubes and supports the cold cathode tubes. The optical member is disposed on top of the cold cathode tubes (see Japanese Laid-Open Patent Application No. 2006-216540, for example).

Furthermore, there has been proposed a backlight unit having a fluorescent lamp, a support structure and a reflecting sheet. The support structure has a rear sheet metal piece disposed substantially parallel to the fluorescent lamp, and a lamp holder that is attached to the rear sheet metal piece and supports the fluorescent lamp. The reflecting sheet is disposed on the side of the rear sheet metal piece opposite the fluorescent lamp and engages with the support structure. The reflecting sheet is capable of parallel movement in a direction parallel to the side of the rear sheet metal piece opposite the fluorescent lamp with respect to the support structure (see Japanese Laid-Open Patent Application 2006-114445, for example).

However, with a conventional liquid crystal module having U-shaped cold cathode tubes produced such that the length from the ends to the U-shaped bent part is the same regardless of how width the U-shaped bent parts are (regardless of the bending pitch), the manufacturing cost increases because a number of straight cold cathode tubes whose overall length varies by the difference in the widths of the U-shaped bent parts have to be readied and bent.

This problem is difficult to be solved by applying the technology of Japanese Laid-Open Patent Application No. 2004-335378, in which cold cathode tubes are bent in an approximately rectangular shape and the short tube segments of the cold cathode tubes are present in substantially the same length in the left and right short tube segment areas, to produce U-shaped cold cathode tubes of different U-shaped bent part widths.

Also, since the techniques in Japanese Laid-Open Patent Application Nos. 2006-216540 and 2006-114445 do not involve the use of U-shaped cold cathode tubes of different U-shaped bent part widths, the above-mentioned problem is difficult to be solved by applying these techniques.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal module with which the cost of a backlight can be reduced despite the use of a plurality of U-shaped cold cathode tubes whose U-shaped bent parts have different widths.

In accordance with one aspect of the present invention, a liquid crystal module includes a rear frame, a light reflecting sheet, a plurality of U-shaped cold cathode tubes, an optical sheet and a liquid crystal panel. The light reflecting sheet is disposed on the rear frame. The U-shaped cold cathode tubes are disposed above the light reflecting sheet and arranged parallel to each other. Each of the U-shaped cold cathode tubes includes a U-shaped bent part and a pair of end portions extending from the U-shaped bent part. Widths of the U-shaped bent parts of the U-shaped cold cathode tubes are different from each other. Overall lengths of the U-shaped cold cathode tubes from one end portions to the other end portions along the U-shaped cold cathode tubes are equal to each other. The optical sheet is disposed above the U-shaped cold cathode tube. The liquid crystal panel is disposed above the optical sheet.

With the liquid crystal module of the present invention, it is possible to provide a liquid crystal module with which the cost of a backlight can be reduced despite the use of a plurality of U-shaped cold cathode tubes whose U-shaped bent parts have different widths.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

A liquid crystal module is a large module that is installed in a wide-screen liquid crystal television set, personal computers and other electronic devices. As shown in FIGS. 1-6, the liquid crystal module basically includes a rear frame 1, a light reflecting sheet 2, a plurality of U-shaped cold cathode tubes 3a, 3b and 3c, a plurality of lamp holders 4, a liquid crystal panel 5, a plurality of optical sheets 6a, 6b and 6c, a plurality of lamp sockets 7 and a pair of left and right lamp frames 8. The rear frame 1 is made of sheet metal. The rear frame 1 has a shallow box shape. The light reflecting sheet 2 is provided on an inside of the rear frame 1. The U-shaped cold cathode tubes 3a, 3b and 3c are arranged on the light reflecting sheet 2 and supported by the lamp holders 4. The liquid crystal module is a direct backlit type liquid crystal module.

Figure 6A:
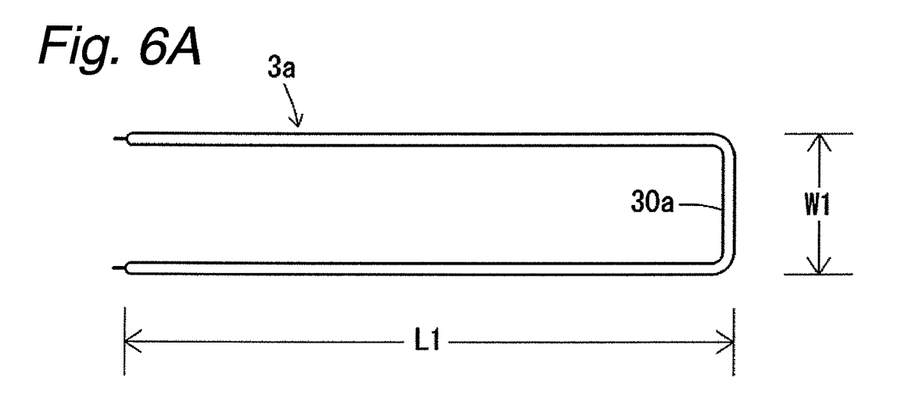
FIGS. 6A, 6B and 6C are plan views of U-shaped cold cathode tubes of the liquid crystal module illustrated in FIG. 1.
Figure 6B:
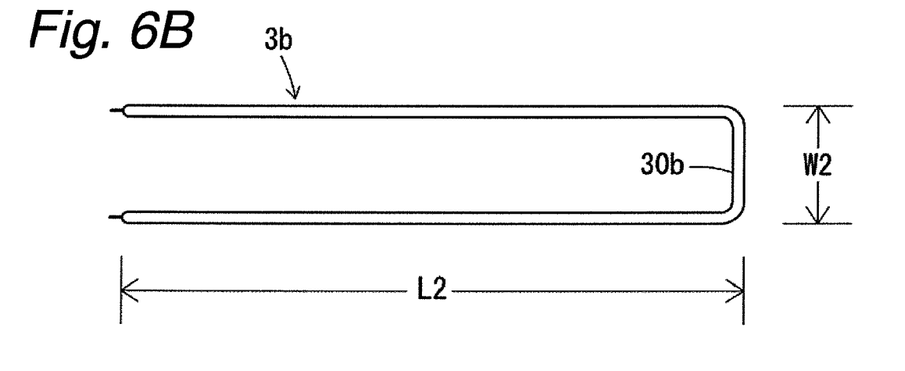
Figure 6C:
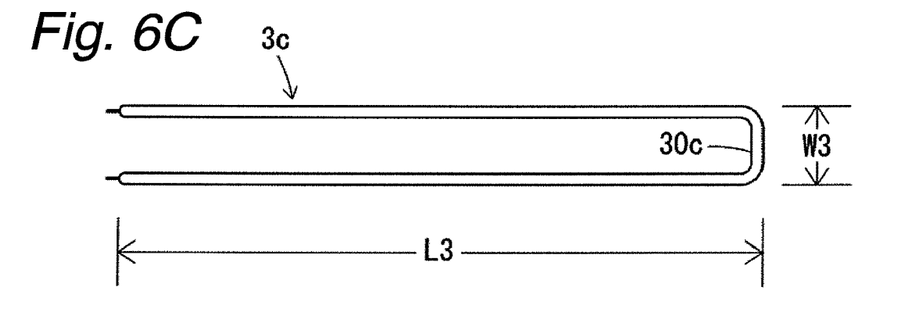

The U-shaped cold cathode tubes 3a, 3b and 3c are different from conventional tubes in that straight cold cathode tubes all having the same overall length are bent in a U-shape with different bending pitches so that the widths W1, W2 and W3 of U-shaped bent parts 30a, 30b and 30c decrease in that order, as shown in FIGS. 6A, 6B and 6C. With the U-shaped cold cathode tubes 3a, 3b and 3c, the length from two ends (e.g., end portions) of each of the U-shaped cold cathode tubes 3a, 3b and 3c to the U-shaped bent parts 30a, 30b and 30c is slightly different according to the differential in the widths of the U-shaped bent parts 30a-30c. In other words, the widths W1, W2 and W3 of the U-shaped bent parts 30a, 30b and 30c of the U-shaped cold cathode tubes 3a, 3b and 3c are different from each other. The overall lengths of the U-shaped cold cathode tubes 3a, 3b and 3c from one ends to the other ends along the U-shaped cold cathode tubes 3a, 3b and 3c are equal to each other. The U-shaped cold cathode tube 3a has the largest W1 of the U-shaped bent part 30a, and has the shortest length L1 from the two ends to the U-shaped bent part 30a. The U-shaped cold cathode tube 3b has an intermediate width W2 of the U-shaped bent part 30b, and has an intermediate length L2 from the two ends to the U-shaped bent part 30b. The U-shaped cold cathode tube 3c has the smallest width W3 of the U-shaped bent part 30c, and has the longest length L3 from the two ends to the U-shaped bent part 30c.

Figure 3:
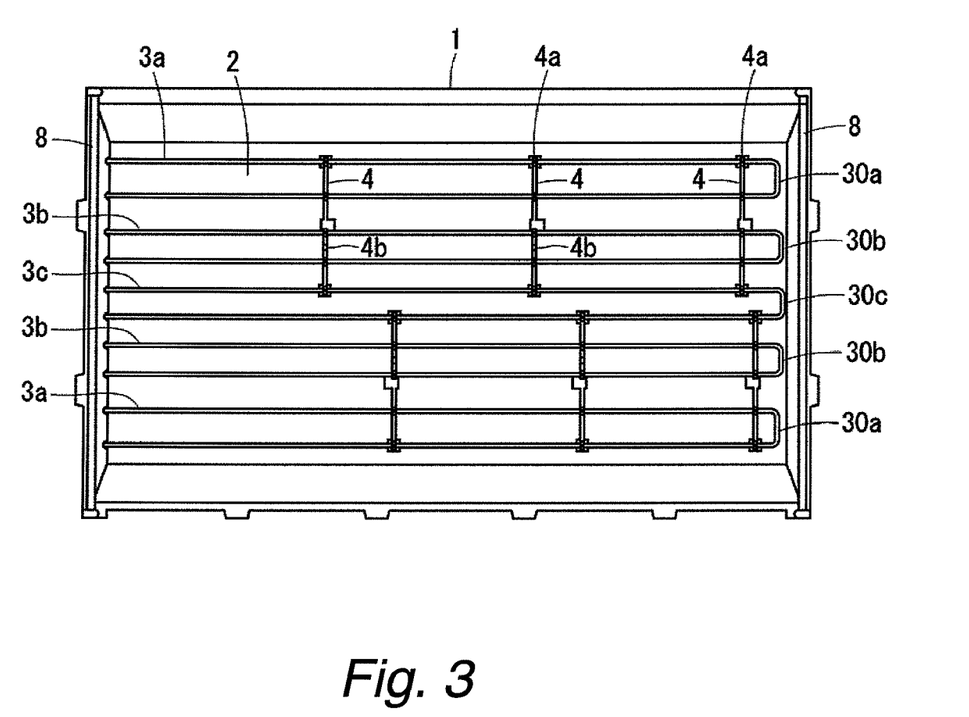
FIG. 3 is a front elevational view of the liquid crystal module illustrated in FIG. 1.

As shown in FIG. 3, the U-shaped cold cathode tube 3c, which has the smallest width W3 of the U-shaped bent part 30c, is disposed at a vertically intermediate position inside the rear frame 1. Two U-shaped cold cathode tubes 3b, which have an intermediate width W2 of the U-shaped bent parts 30b, are disposed are either side of the U-shaped cold cathode tube 3c and separated by the same distance as the width W3. Two U-shaped cold cathode tubes 3a, which have the largest W1 of the U-shaped bent parts 30a, are disposed on either side of the U-shaped cold cathode tubes 3b and separated by the same distance as the width W1. The U-shaped cold cathode tubes 3a-3c are supported by the lamp holders 4, respectively. With this arrangement, it is possible to reduce brightness unevenness of the liquid crystal panel 5 and so forth.

Figure 1:
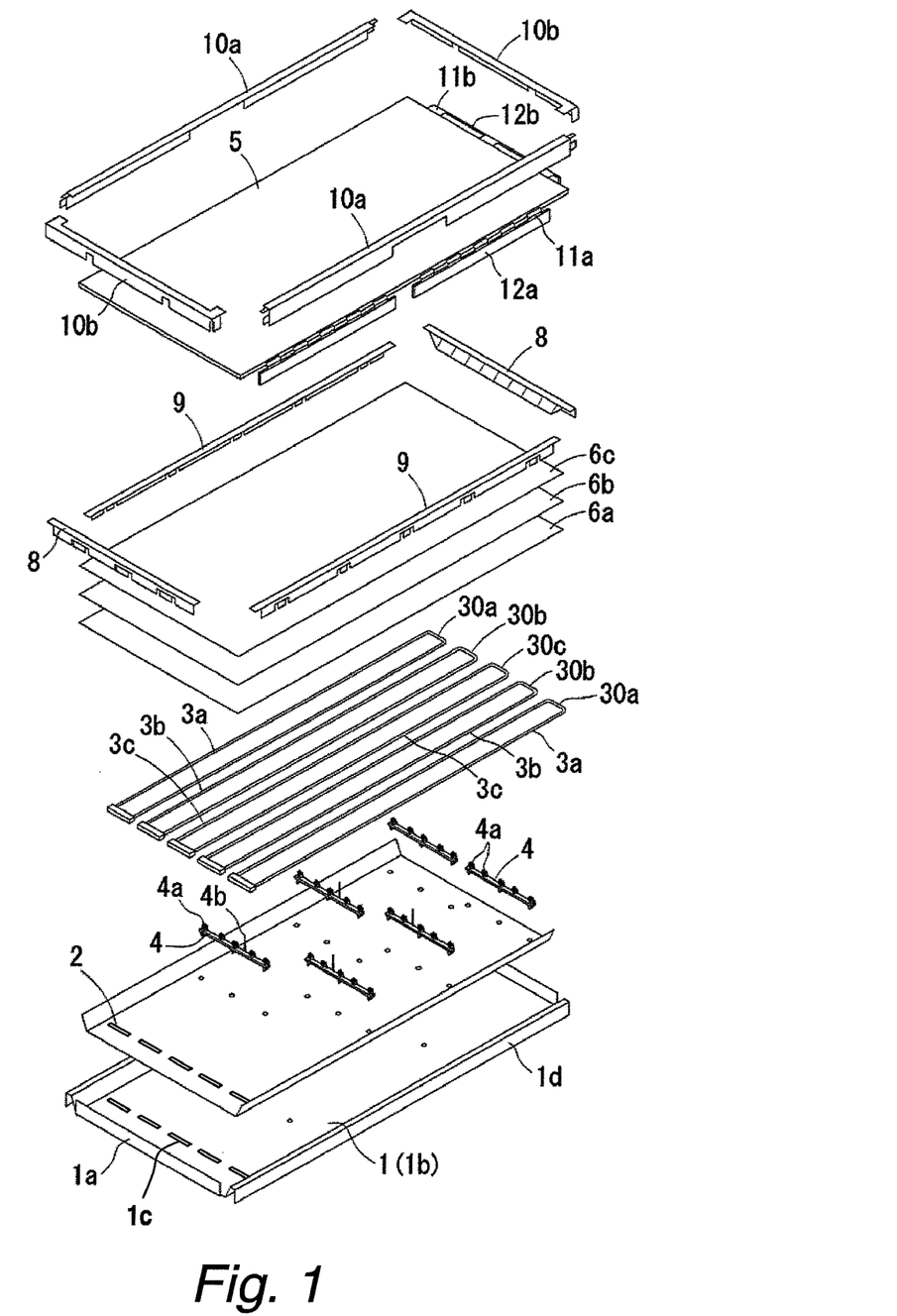
FIG. 1 is an exploded perspective view of a liquid crystal module in accordance with one embodiment of the present invention.
Figure 4:
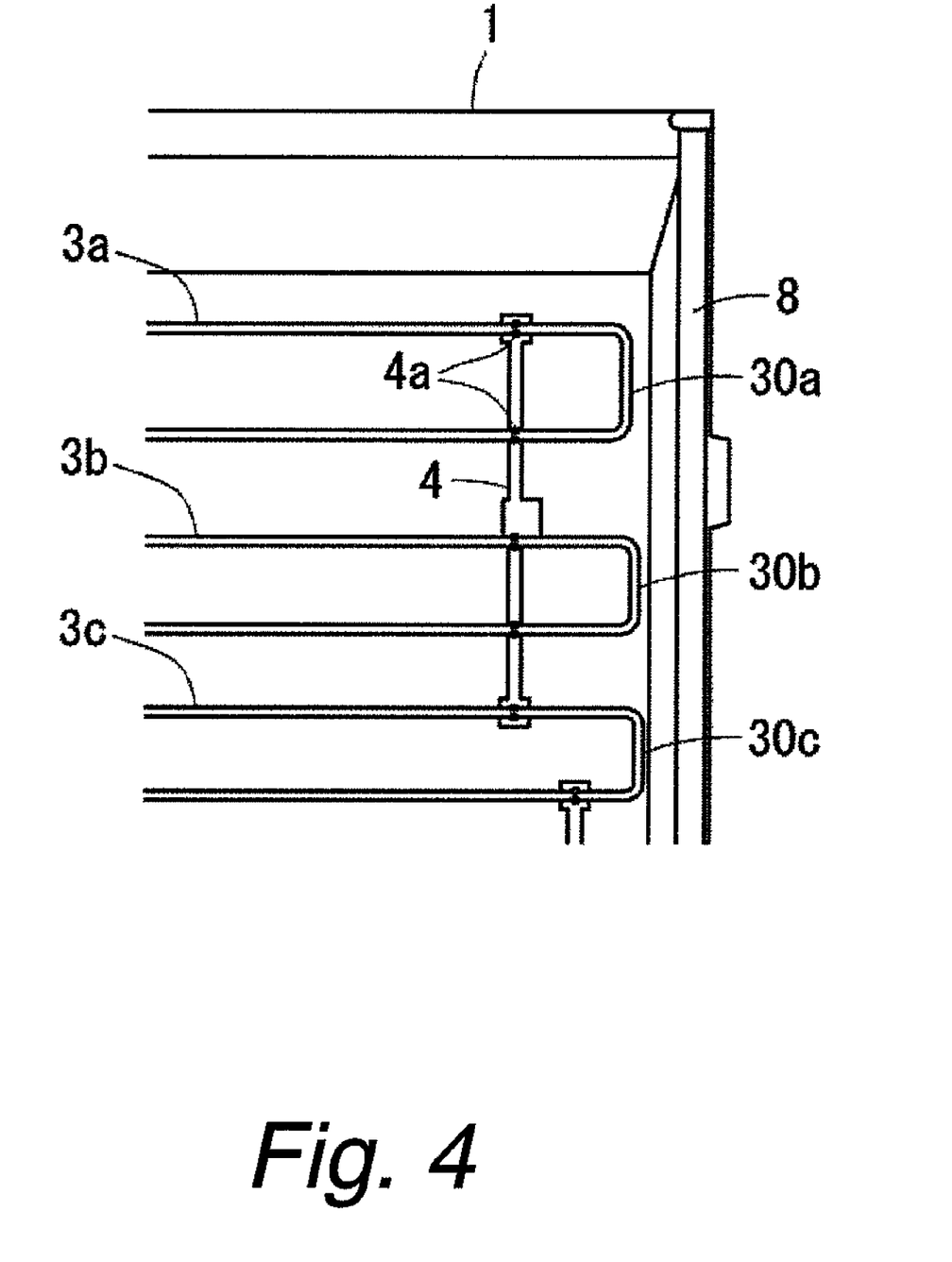
FIG. 4 is a partial front elevational view of an upper right portion of the liquid crystal module illustrated in FIG. 1.

As shown in FIGS. 3 and 4, each of the lamp holders 4 has five supports 4a into which the U-shaped cold cathode tubes 3a, 3b and 3c are clipped and supported. Furthermore, as shown in FIGS. 1 and 3, posts 4b are formed on the lamp holders 4, which support the middle parts of the U-shaped cold cathode tubes 3a, 3b and 3c. The posts 4b support the optical sheets 6a, 6b and 6c and the liquid crystal panel 5 from below and prevent sagging.

Figure 5:
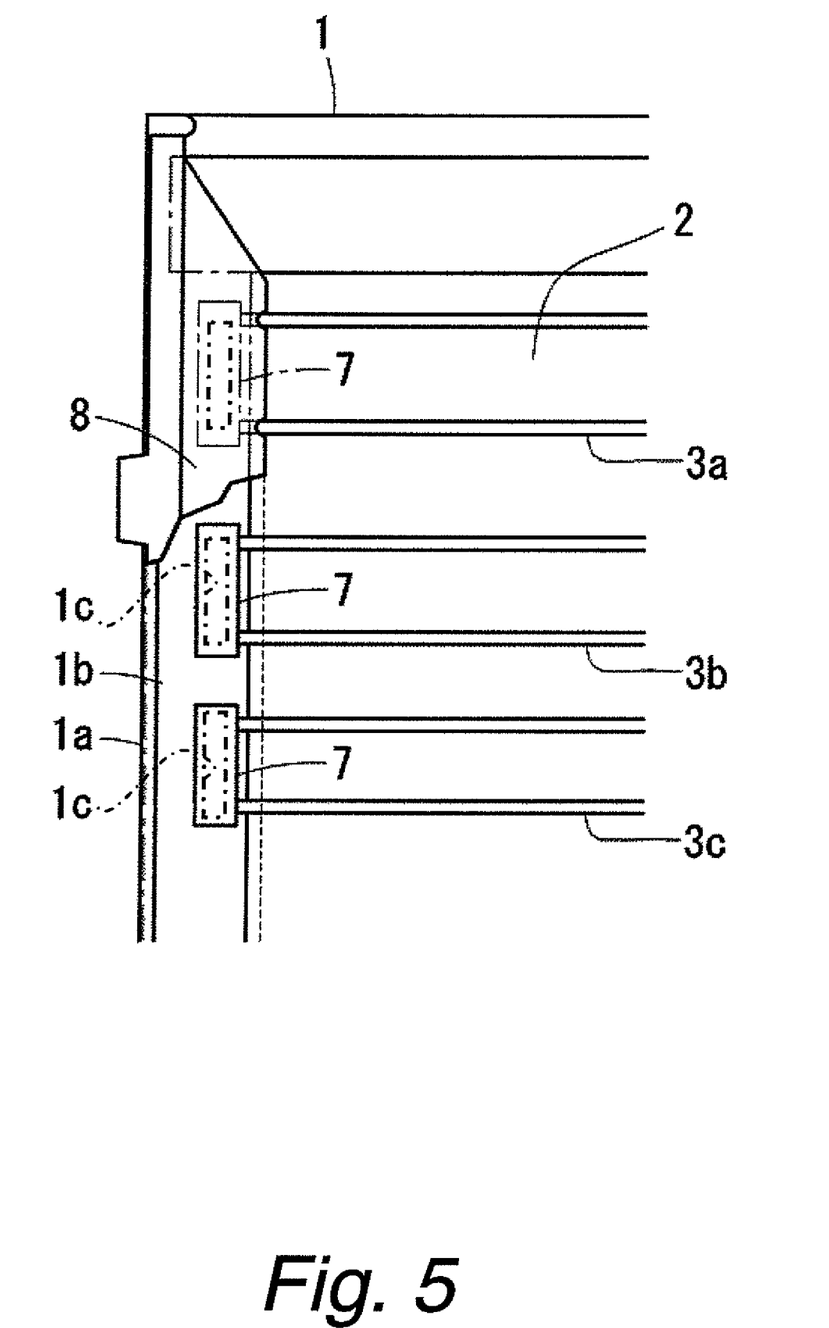
FIG. 5 is a partial front elevational view of an upper left portion of the liquid crystal module illustrated in FIG. 1.

As shown in FIGS. 1 and 5, the lamp sockets 7 are attached to the ends of the U-shaped cold cathode tubes 3a, 3b and 3c. The lamp sockets 7 are installed in a corresponding number of socket mounting openings 1c formed in a bottom plate 1b of the rear frame 1, spaced a specific distance away from a left side plate 1a (the one on the left side) of the rear frame 1 in a horizontal direction of the liquid crystal module. In other words, the number of the socket mounting openings 1c is equal to the number of the lamp sockets 7. This aligns the positions of the ends of the U-shaped cold cathode tubes 3a, 3b and 3c. Specifically, the ends of the U-shaped cold cathode tubes 3a, 3b and 3c are positioned at locations aligned in a vertical direction of the liquid crystal module and spaced from the left side plate 1a of the rear frame by a specific distance. As shown in FIG. 4, the U-shaped bent parts 30a, 30b and 30c on the opposite are attached in a state of being shifted in the length direction of the U-shaped cold cathode tubes 3a, 3b and 3c by the difference in the lengths L1, L2 and L3 of the U-shaped cold cathode tubes 3a, 3b and 3c. In other words, the U-shaped bent parts 30a, 30b and 30c are positioned at locations offset in the horizontal direction of the liquid crystal module according to the widths W1, W2 and W3 of the U-shaped bent parts 30a, 30b and 30c.

As shown in FIG. 5, the ends of all of the U-shaped cold cathode tubes 3a, 3b and 3c to which the lamp sockets 7 have been attached are covered with a left lamp frame 8 from above. The left lamp frame 8 also serves as a cell guide and is attached to the left side plate 1a of the rear frame 1. In contrast, as shown in FIG. 4, the U-shaped bent parts 30a, 30b and 30c at the opposite ends of the U-shaped cold cathode tubes 3a, 3b and 3c are shifted to positions towards the inside of the rear frame 1 away from a right lamp frame 8 attached to a right side plate 1a on the opposite side of the rear frame 1. In other words, the U-shaped bent parts 30a, 30b and 30c are positioned at locations spaced from the right lamp frame 8 in the horizontal direction towards the left lamp frame 8. The right lamp frame 8 also serves as a cell guide. As a result, compared to when the U-shaped bent parts 30a, 30b and 30c are shifted on the inside of the lamp frame 8, the shift range can be set larger, and light emitted from the exposed U-shaped bent parts 30a, 30b and 30c can be utilized more effectively. Also, since both ends of all of the U-shaped cold cathode tubes 3a, 3b and 3c to which lamp sockets 7 have been attached are covered with the left lamp frame 8 attached to the left side plate 1a of the rear frame 1, the uneven brightness caused by shadows from the lamp sockets 7, etc., is eliminated.

Figure 2:
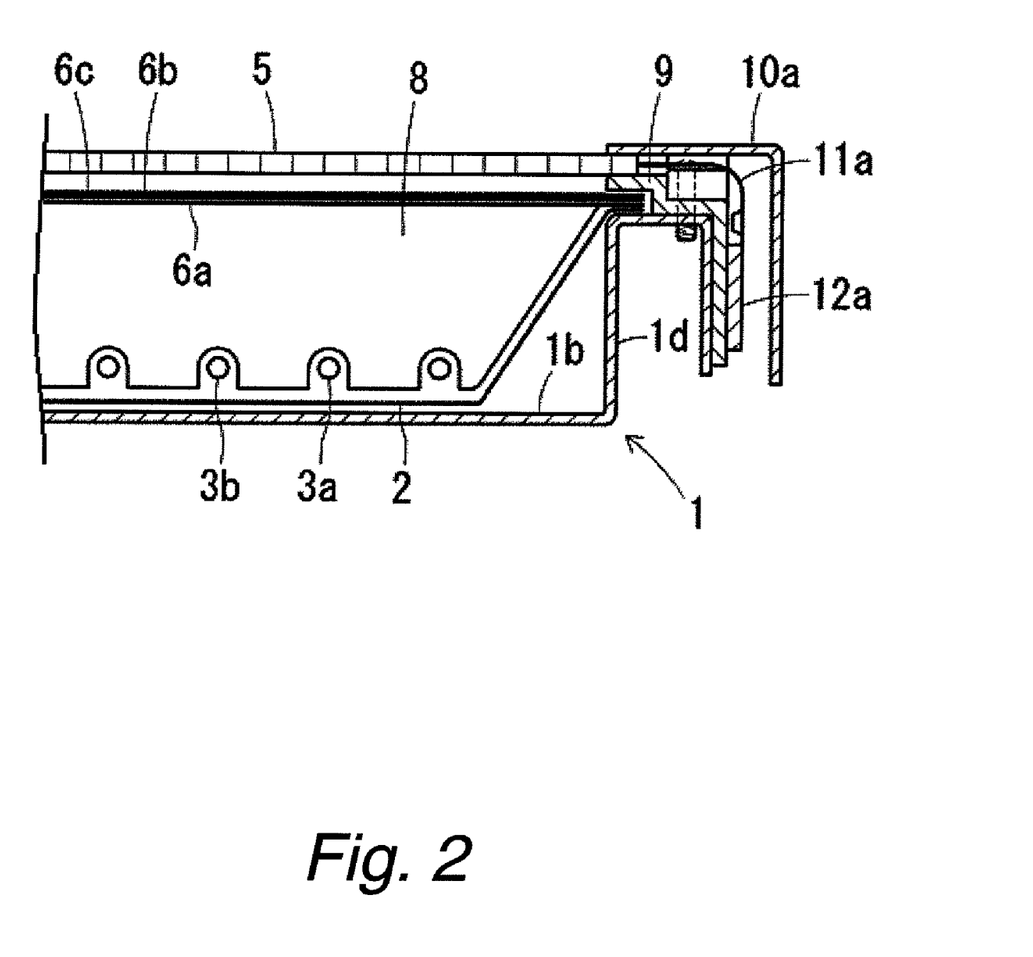
FIG. 2 is a partial cross sectional view of the liquid crystal module illustrated in FIG. 1.

As shown in FIGS. 1 and 2, the edges of the three optical sheets 6a, 6b and 6c are placed on the top faces of top and bottom side plates 1d of the rear frame 1, and are held down by a pair of bezel guides 9 attached to the top and bottom side plates 1d. The four edges of the liquid crystal panel (e.g., liquid crystal cell) 5 are placed over the bezel guides 9 and the left and right lamp frames 8, and are held down and fixed by four bezels (two bezels 10a and two bezels 10b).

The optical sheets 6a, 6b and 6c are light diffusing sheets. The optical sheets 6a, 6b and 6c diffuse light emitted from the U-shaped cold cathode tubes 3a, 3b and 3c so that it shines uniformly over the liquid crystal panel 5. The top two optical sheets 6b and 6c are thin light diffusing sheets, but the lower optical sheet 6a is a light diffusing sheet (e.g., light diffusing plate) that is in the form of a thick panel that is resistant to sagging.

A printed circuit board (X-PCB) 12a in the form of a strip is connected to a long side of the liquid crystal panel 5 via a COF (chip-on-film) 11a on which a source-drain IC chip is mounted. A printed circuit board (Y-PCB) 12b in the form of a strip is connected to a short side of the liquid crystal panel 5 via a COF 11b on which a gate-driver IC chip is mounted. The printed circuit boards 12a and 12b are fixed to the outer faces of the bezel guide 9 and the lamp frame 8.

With the liquid crystal panel, all of the U-shaped cold cathode tubes 3a, 3b and 3c have the same overall length, and are produced by bending straight cold cathode tubes of the same length into a U-shape at different bending pitches. The U-shaped cold cathode tubes 3a, 3b and 3c have U-shaped bent parts 30a, 30b and 30c of different widths W1, W2 and W3. Thus, there is no need to ready different kinds of straight cold cathode tubes of varying length as in the past. Therefore, the cost can be reduced accordingly. The U-shaped cold cathode tubes 3a, 3b and 3c have the same overall length, but the U-shaped bent parts 30a, 30b and 30c have different widths W1, W2 and W3. The lengths L1, L2 and L3 from the ends of the U-shaped cold cathode tubes 3a, 3b and 3c to the U-shaped bent parts 30a, 30b and 30c are varied slightly according to the width of the U-shaped bent part. Thus, various layout configurations can be employed, but as mentioned above, it is preferable to employ a layout configuration in which the positions of the two ends of the U-shaped cold cathode tubes 3a, 3b and 3c are aligned so that the distance from the left side plate 1a of the rear frame 1 to the ends of the U-shaped cold cathode tubes 3a, 3b and 3c is the same for all, and the positions of the U-shaped bent parts 30a, 30b and 30c of the U-shaped cold cathode tubes 3a, 3b and 3c are shifted in the length direction of the U-shaped cold cathode tubes 3a, 3b and 3c according to the differential in width of the U-shaped bent parts 30a, 30b and 30c. Furthermore, the lamp sockets 7 attached to the ends of the U-shaped cold cathode tubes 3a, 3b and 3c are installed in the socket mounting openings 1c formed in the bottom plate 1b of the rear frame 1a specific distance away from the left side plate 1a of the rear frame 1. The positions of the ends of the U-shaped cold cathode tubes 3a, 3b and 3c are aligned, and the U-shaped bent parts 30a, 30b and 30c at the opposite end are shifted in a lengthwise direction of the U-shaped cold cathode tubes 3a, 3b and 3c. Thus, a conventional rear frame having socket mounting openings can be used without any design modifications. Specifically, a rear frame of a liquid crystal module containing conventional U-shaped cold cathode tubes having U-shaped bent parts of different widths (a rear frame in which openings are formed for mounting lamp sockets at both ends of the U-shaped cold cathode tubes) and so forth can be used without any design modifications. Therefore, there is none of the increase in cost that would be entailed by design modifications and so forth, which means that cost can be further reduced.

The liquid crystal module has five U-shaped cold cathode tubes 3a, 3b and 3c of three different kinds, and U-shaped bent parts 30a, 30b and 30c of the U-shape cold cathode tubes 3a, 3b and 3c have different widths. However, various design changes are permitted within the scope of the claims, such as suitably increasing or decreasing the number and type of U-shaped cold cathode tubes used.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
   a rear frame;
   a light reflecting sheet disposed on the rear frame;
   a plurality of U-shaped cold cathode tubes disposed above the light reflecting sheet and arranged parallel to each other, the U-shaped cold cathode tubes being independently formed as separate members, respectively, each of the U-shaped cold cathode tubes including a U-shaped bent part and a pair of end portions extending from the U-shaped bent part, overall vertical widths of the U-shaped cold cathode tubes in a vertical direction of the liquid crystal module being different from each other, overall horizontal lengths of the U-shaped cold cathode tubes in a horizontal direction of the liquid crystal module being different from each other, overall lengths of the U-shaped cold cathode tubes from one end portions to the other end portions along the U-shaped cold cathode tubes being equal to each other;

an optical sheet disposed above the U-shaped cold cathode tube; and a liquid crystal panel disposed above the optical sheet.

2. The liquid crystal module according to claim 1, wherein the rear frame has a bottom plate with a pair of opposite sides, and first and second side plates that extend forward of the rear frame relative to the bottom plate, respectively, the first and second side plates further extending along the opposite sides of the bottom plate, respectively.

3. The liquid crystal module according to claim 2, wherein the end portions of the U-shaped cold cathode tubes are positioned at locations aligned in the vertical direction of the liquid crystal module and spaced from the first side plate of the rear frame, and the U-shaped bent parts of the U-shaped cold cathode tubes are positioned at locations offset in the horizontal direction of the liquid crystal module according to the overall vertical widths of the U-shaped cold cathode tubes.

4. The liquid crystal module according to claim 3, further comprising a plurality of lamp sockets attached to the end portions of the U-shaped cold cathode tubes, the lamp sockets being mounted to socket mounting openings that are formed in the bottom plate of the rear frame at locations spaced apart from the first side plate of the rear frame, the number of the socket mounting openings being equal to the number of the lamp sockets.

5. The liquid crystal module according to claim 4, further comprising a pair of first and second lamp frames attached to the first side plate of the rear frame and the second side plate of the rear frame being located opposite the first side plate, respectively, the end portions of the U-shaped cold cathode tubes and the lamp sockets attached to the end portions being covered with the first lamp frame from above, and the U-shaped bent parts of the U-shaped cold cathode tubes being positioned at locations spaced from the second lamp frame in the horizontal direction of the liquid crystal module towards the first lamp frame.

6. The liquid crystal module according to claim 1, wherein one of the U-shaped cold cathode tubes being disposed closer to a vertical center of the liquid crystal module than adjacent one of the U-shaped cold cathode tube is, the one of the U-shaped cold cathode tubes having a smaller overall vertical width in the vertical direction of the liquid crystal module than the adjacent one of the U-shaped cold cathode tube.

7. The liquid crystal module according to claim 6, wherein the rear frame has a bottom plate with a pair of opposite sides, and first and second side plates that extend forward of the rear frame relative to the bottom plate, respectively, the first and second side plates further extending along the opposite sides of the bottom plate, respectively.

8. The liquid crystal module according to claim 7, wherein the end portions of the U-shaped cold cathode tubes are positioned at locations aligned in the vertical direction of the liquid crystal module and spaced from the first side plate of the rear frame, and the U-shaped bent parts of the U-shaped cold cathode tubes are positioned at locations offset in the horizontal direction of the liquid crystal module according to the overall vertical widths of the U-shaped cold cathode tubes.

9. The liquid crystal module according to claim 8, further comprising a plurality of lamp sockets attached to the end portions of the U-shaped cold cathode tubes, the lamp sockets being mounted to socket mounting openings that are formed in the bottom plate of the rear frame at locations spaced apart from the first side plate of the rear frame, the number of the socket mounting openings being equal to the number of the lamp sockets.

10. The liquid crystal module according to claim 9, further comprising a pair of first and second lamp frames attached to the first side plate of the rear frame and the second side plate of the rear frame being located opposite the first side plate, respectively, the end portions of the U-shaped cold cathode tubes and the lamp sockets attached to the end portions being covered with the first lamp frame from above, and the U-shaped bent parts of the U-shaped cold cathode tubes being positioned at locations spaced from the second lamp frame in the horizontal direction of the liquid crystal module towards the first lamp frame.

11. The liquid crystal module according to claim 1, wherein one of the U-shaped cold cathode tubes being disposed closer to a vertical center of the liquid crystal module than adjacent one of the U-shaped cold cathode tube is, the one of the U-shaped cold cathode tubes having a larger overall horizontal length in the horizontal direction of the liquid crystal module than the adjacent one of the U-shaped cold cathode tube.

12. The liquid crystal module according to claim 11, wherein the rear frame has a bottom plate with a pair of opposite sides, and first and second side plates that extend forward of the rear frame relative to the bottom plate, respectively, the first and second side plates further extending along the opposite sides of the bottom plate, respectively.

13. The liquid crystal module according to claim 12, wherein the end portions of the U-shaped cold cathode tubes are positioned at locations aligned in the vertical direction of the liquid crystal module and spaced from the first side plate of the rear frame, and the U-shaped bent parts of the U-shaped cold cathode tubes are positioned at locations offset in the horizontal direction of the liquid crystal module according to the overall vertical widths of the U-shaped cold cathode tubes.

14. The liquid crystal module according to claim 13, further comprising a plurality of lamp sockets attached to the end portions of the U-shaped cold cathode tubes, the lamp sockets being mounted to socket mounting openings that are formed in the bottom plate of the rear frame at locations spaced apart from the first side plate of the rear frame, the number of the socket mounting openings being equal to the number of the lamp sockets.

15. The liquid crystal module according to claim 14, further comprising a pair of first and second lamp frames attached to the first side plate of the rear frame and the second side plate of the rear frame being located opposite the first side plate, respectively, the end portions of the U-shaped cold cathode tubes and the lamp sockets attached to the end portions being covered with the first lamp frame from above, and the U-shaped bent parts of the U-shaped cold cathode tubes being positioned at locations spaced from the second lamp frame in the horizontal direction of the liquid crystal module towards the first lamp frame.

16. A liquid crystal module comprising:
a rear frame having a bottom plate with a pair of opposite sides, and first and second side plates that extend forward of the rear frame relative to the bottom plate, respectively, the first and second side plates further extending along the opposite sides of the bottom plate, respectively;
a light reflecting sheet disposed on the bottom plate of the rear frame;
a plurality of U-shaped cold cathode tubes disposed above the light reflecting sheet and arranged parallel to each other, each of the U-shaped cold cathode tubes including a U-shaped bent part and a pair of end portions extending from the U-shaped bent part, widths of the U-shaped bent parts of the U-shaped cold cathode tubes being different from each other, overall lengths of the U-shaped cold cathode tubes from one end portions to the other end portions along the U-shaped cold cathode tubes being equal to each other;
an optical sheet disposed above the U-shaped cold cathode tube; and
a liquid crystal panel disposed above the optical sheet,
the end portions of the U-shaped cold cathode tubes being positioned at locations aligned in a vertical direction of the liquid crystal module and spaced from the first side plate of the rear frame by a specific distance, and
the U-shaped bent parts of the U-shaped cold cathode tubes being positioned at locations offset in a horizontal direction of the liquid crystal module according to the widths of the U-shaped bent parts of the U-shaped cold cathode tubes.

17. The liquid crystal module according to claim 16, further comprising
a plurality of lamp sockets attached to the end portions of the U-shaped cold cathode tubes, the lamp sockets being mounted to socket mounting openings that are formed in the bottom plate of the rear frame at locations spaced apart from the first side plate of the rear frame, the number of the socket mounting openings being equal to the number of the lamp sockets.

18. The liquid crystal module according to claim 17, further comprising
a pair of first and second lamp frames attached to the first side plate of the rear frame and the second side plate of the rear frame being located opposite the first side plate, respectively,
the end portions of the U-shaped cold cathode tubes and the lamp sockets attached to the end portions being covered with the first lamp frame from above, and
the U-shaped bent parts of the U-shaped cold cathode tubes being positioned at locations spaced from the second lamp frame in the horizontal direction of the liquid crystal module towards the first lamp frame.

* * * * *